United States Patent
Atkinson

(10) Patent No.: US 6,694,451 B2
(45) Date of Patent: Feb. 17, 2004

(54) METHOD FOR REDUNDANT SUSPEND TO RAM

(75) Inventor: Lee W. Atkinson, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 552 days.

(21) Appl. No.: 09/732,290

(22) Filed: Dec. 7, 2000

(65) Prior Publication Data

US 2002/0073358 A1 Jun. 13, 2002

(51) Int. Cl.[7] ................................................. G06F 11/00
(52) U.S. Cl. ................................. 714/15; 714/6; 714/21
(58) Field of Search ................................. 711/156, 162; 713/320, 323, 324, 330; 714/6, 15, 22, 21

(56) References Cited

U.S. PATENT DOCUMENTS

| | | | | |
|---|---|---|---|---|
| 4,809,279 A | * | 2/1989 | Kim et al. | 714/805 |
| 5,218,704 A | | 6/1993 | Watts, Jr. et al. | 395/750 |
| 6,243,831 B1 | * | 6/2001 | Mustafa et al. | 714/24 |
| 6,247,151 B1 | * | 6/2001 | Poisner | 714/718 |
| 6,389,556 B1 | * | 5/2002 | Qureshi | 714/15 |
| 6,510,528 B1 | * | 1/2003 | Freeman et al. | 714/6 |
| 6,546,472 B2 | * | 4/2003 | Atkinson et al. | 711/156 |
| 2002/0099946 A1 | * | 7/2002 | Herbert et al. | 713/193 |

OTHER PUBLICATIONS

FOLDOC, "Free On–Line Dictionary of Computing", non–volatile storage, May 22, 2000, http://burks.brighton.ac.uk/burks/foldoc/2/81.htm.*

* cited by examiner

Primary Examiner—Nadeem Iqbal
Assistant Examiner—Joshua Lohn

(57) ABSTRACT

A computer system supports suspend operations to save power. The suspend operation maintains power to the system memory to enable a quick recovery from the suspend mode. To insure the accuracy of the data in system memory, a copy of the data is backed up to non-volatile memory, such as a hard disk drive, prior to entering the suspend mode. In addition, a signature value representing blocks or pages of memory also is saved with the data. When normal operation resumes, data in system memory is validated by calculating a new signature for each data block or page, and comparing it with the save signature values. If the signatures match, the data is assumed to be valid. If the values do not match, a restore operation proceeds to load the back up copy to that block of system memory. The algorithm may be run immediately upon resuming operation, or may run in the background when the CPU is idle. In the event a transaction occurs prior to validation of a particular memory location, the access is interrupted and the data is validated or restored. In addition, the error checking and restoration operations may be used during normal system operations to insure the integrity of data in the system memory or other volatile memory components.

59 Claims, 5 Drawing Sheets

METHOD FOR REDUNDANT SUSPEND TO RAM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to data storage in computer systems. More particularly, the present invention relates to the validation of data that has been stored in random access memory during periods when the data is susceptible of becoming corrupted, or in mission critical computer systems where tolerance for error is low.

2. Background of the Invention

Almost all computer systems include a processor and a system memory. The system memory functions as the working memory of the computer system, where data is stored that has been or will be used by the processor and other system components. The system memory typically includes banks of dynamic random access memory (DRAM) circuits. According to normal convention, a memory controller interfaces the processor to a memory bus that connects electrically to the DRAM circuits. The system memory provides storage for a large number of instructions and/or a large amount of data for use by the processor, providing faster access to the instructions and/or data than would otherwise be achieved if the processor were forced to retrieve data from a disk or drive.

Because system memory typically is constructed of dynamic random access memory circuits, the contents of the memory are volatile. To preserve the integrity of the data stored in system memory, a periodic refresh signal must be sent to each memory cell to refresh the voltage levels of each cell, where the data is stored. Failure to timely refresh the memory cells of system memory causes the data to be lost. Thus, when power is turned off to a computer, the contents of system memory are lost. Data that is to be stored long-term on a computer system thus is stored in other non-volatile memory devices. Most computer systems include a hard drive which is capable of permanently storing data on magnetic tape. Other removable drives, such as zip drives, CD-ROMs, DVD-ROMs, and the like, may also be used for long-term storage of data. In these types of media, the data is preserved, even when power is removed from the computer system.

Almost all portable computers, and some desktop computers, may be placed in a low power state to preserve power. Preservation of power is especially important in portable computers, where operating power may be provided from batteries. To extend the life of batteries in portable computers, and thus extend the amount of time that a user can operate a portable computer without recharging the batteries or finding an electrical source, most portable computers are capable of going into a sleep mode where minimal power is consumed. The sleep mode permits the computer system to be placed in standby, so that operation can resume when the user is ready, without requiring the system to boot.

As power management of portable computer systems has evolved, two different low power modes have been developed and used commercially. The first low power mode is known as "hibernation" or "hibernation to disk." In this mode, which is the lowest power mode of the computer system other than power-off, the computer system consumes minimal energy. The hibernation mode can be analogized to a no-power bookmark of the existing state of the computer system. When the hibernation mode is entered, the system hardware state is copied to the hard drive. Because the hard drive is non-volatile memory, all power can then be removed from the system. Upon resume, the entire system state is copied from the hard drive image and restored to system memory and to the devices whose state was copied. Hibernation to disk typically is referred to as the "S4" state by the ACPI nomenclature.

In hibernation mode, the system memory (or RAM) is not powered. Hibernation to Disk has been referred to as "Zero volt suspend" because no power is required to sustain the system contents. Thus, the data in system memory is no longer available once the system enters the hibernation mode because the memory cells are not refreshed. When resuming from hibernation, a delay period is encountered as the working data is reloaded from the hard drive back to the system memory. The time required to access data from the hard drive is significantly longer than accessing data from system memory. Thus, there is a perceptible delay that occurs when data is loaded form the hard drive to the system memory after the hibernation mode is exited. In many instances the resume process from hibernation mode can take between 30 seconds to 1 minute, as the system memory and system devices are completely restored from the relatively slow hard drive memory.

Conventional Hibernation to Disk is implemented by powering down the system in response to a system event. The system event can be the manual selection of an icon or menu entry, the selection of one or more keys, or system inactivity. Because the hibernation mode results in the removal of power, the context of all system peripherals is read and then stored to the hard drive. Next, the contents of the system memory are copied to the hard drive. A hard drive file that is equal to the size of the memory to be stored is created, which holds a mirror image of the system memory. After the contents of system memory are backed up, a flag is set in non-volatile memory indicating that the system context has been completely saved. Once the flag is set, the power is removed causing the contents of volatile memory (such as DRAM and the context of peripheral devices) to be lost. When the system resumes operation, the system BIOS or operating system polls the nonvolatile flag bit that indicates that the hard drive contains valid system context. If the flag bit is set, the BIOS or operating system restores the system context from the hard drive before resuming system operation.

The second low power state is referred to as the "suspend" mode or "Suspend to RAM" mode. In the suspend mode, the system memory remains powered while the system is taken to a non-operational state. The advantage of keeping the system memory powered is that when operation is resumed, the system is ready within a very short period for operation, in the state last used by the operator. Thus, resuming from a suspend mode only takes a few seconds, because very little system context is moved. Suspend to RAM generally is preferred as a bookmark feature because of its "instant on" low latency resume time. Suspend to RAM is also called the S1, S2, or S3 power state by the ACPI nomenclature.

Conventional Suspend to RAM works by stopping the clocks to the system, while leaving the entire system power on. Because the power used by the system depends on the system clock speeds, removing the clock signals significantly lowers the system power. Suspend to RAM often is referred to as "Power on Suspend." When the system resumes operation from Suspend to RAM, the clocks may simply be started to restore system operation. Another form of Suspend to RAM stores the context of certain system devices to system memory. Examples of the device contexts that may be saved include peripherals such as audio controllers, the state of the processor, the contents of the processor cache, and the like. Once the context of these devices is stored to system memory, the clocks to those devices are stopped and power is removed. The system memory, however, remains powered to maintain its contents. To resume operation, the system BIOS or operating system restores the context of the peripherals from system memory, and then system operation is resumed.

The hibernation mode has been preferred because little or no power is consumed while the system is in this state. Recent improvements in the circuitry used for Suspend to RAM, however, have minimized the power drain that occurs in suspend mode. However, Hibernation to Disk still has a key integrity advantage over Suspend to RAM, because Suspend to RAM relies on the use of volatile DRAM memory. If power is lost to the DRAM during suspend mode, the system context is lost, and the user may lose work or data. Also, DRAM is inherently subject to data corruption because the DRAM cells must be periodically refreshed to maintain a charge on very small capacitors that represent each data bit. A leaky cell, high temperature, or electromagnetic interference can invalidate the contents of the DRAM. These or other conditions may cause the DRAM contents to become corrupted while the system is in suspend mode.

Traditionally, the use of either Suspend to RAM or Hibernation to Disk have been exclusive, so that only one of these techniques is implemented as the low power state in a computer system. Recently, the IBM 600 portable computer advanced an idea marketed as "Redisafe," in which Suspend to RAM was used, but the system contents also were stored redundantly to the hard drive. In the event that the system loses power while in suspend mode, the system BIOS restores the system contents from the hard drive. If power is not lost, the system resumes operation from system memory. Thus, the Redisafe system provided a redundant backup copy of the system memory, thereby protecting the user from a power loss, while still preserving the lower latency of the Suspend to RAM mode if power was not lost.

While this approach has some advantages over the previous low power modes, it still does not protect the user from the potential of hardware problems that may result during a Suspend to RAM. The IBM system relies solely on detecting a loss of power during suspend mode, and does not gauge the integrity of the DRAM contents after the resume is completed. Thus, while the IBM system takes measures to insure the integrity of system memory in the event of a power failure, it does not consider the validity of the data itself.

It would be desirable if a system could be developed that would minimize latency to the extent possible for a low power mode of a computer system. It would also be advantageous if a computer system provided a low power mode which could be resumed quickly in the event that the contents of system memory were valid, but which used a copy of data that had been saved to non-volatile memory in the event that the data in system memory was not valid. Despite the apparent advantages such a system would offer, to date no such system has been developed.

BRIEF SUMMARY OF THE INVENTION

The present invention solves the deficiencies of the prior art by implementing a low power mode in a computer system that stores a copy of the data in system memory to the hard drive prior to entering the suspend mode. The system supports a quick resume from suspend if the data in system memory is valid. If the data in system memory is not valid, then the system causes the data to be restored from the hard drive. Thus, the system supports a quick resume, while also supporting a system that insures data integrity in the suspend mode. To minimize the amount of data that must be reloaded in the event the data is corrupted, the system memory may be partitioned into smaller blocks or pages that can be validated independently.

According to one exemplary embodiment of the present invention, error checking and correction memory is used as the system memory. Prior to entering a Suspend to RAM state, the system stores a backup copy of the system memory and other context information to the hard drive. When the system resumes from the suspended state, the CPU reads system memory. If error checking and correction memory is implemented, appropriate ECC logic will examine the data read from memory, and if errors are detected, the ECC logic will generate a non-maskable interrupt (NMI). An algorithm executing on the CPU acknowledges the NMI, and identifies the memory address being read which caused generation of the NMI. The CPU then reads the backup copy of that address range from the hard drive, and restores that memory range to the system memory, as a substitute for the invalid data in system memory. This operation is repeated until all data in system memory is examined.

As an alternative embodiment, the present invention may be used in systems that do not implement ECC memory, by having the CPU or some other programmable device perform the error checking of system memory. In this embodiment, the CPU detects initiation of a low power state, and reads each page of memory. For each page of memory, the CPU calculates a signature for that page. The signature may represent a checksum value, a cycle redundancy check (CRC) value, or any other appropriate signature that can be used to later verify the validity of the data upon exiting from a low power mode. After the signature is calculated, that page of memory is saved to the hard drive. The signature value also is saved to either non-volatile memory or to volatile memory. Thus, the signature may be saved to static RAM, the hard drive, or to system memory. This process is repeated until a signature is calculated for each memory page, and the memory page and signature have been saved. When the system resumes from suspend mode, the CPU reads a page of system memory and calculates the signature. The calculated signature is then compared with the saved signature value. If the signatures match, the data for that page is assumed valid. If the signatures do not match, the data in that page is assumed to be invalid, and the CPU then restores the backup copy for that page from the hard drive. This process is repeated until all pages are validated or replaced.

The present invention also may be configured to run in the background after operation is resumed from a low power mode. In that event, the page translation tables are programmed to respond with a Page Fault interrupt if an access is directed to a section of memory that has not yet been validated. In response to the Page Fault Interrupt, an algorithm executing on the CPU determines if the Page Fault interrupt was generated because data had not been validated, or because the application software had not yet utilized the memory. If the algorithm determines that this memory address has not been validated, then the algorithm proceeds to validate that page of memory, and preferably all other pages in that Page Directory.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "system memory" refers to the working memory of a computer system. The term "DRAM" is intended to refer to system memory that is implemented with dynamic random access memory components. To the extent that any term is not specially defined in this specification, the intent is that the term is to be given its plain and ordinary meaning.

DETAILED DESCRIPTION OF THE PREFERRED EMBODIMENTS

Figure 1:
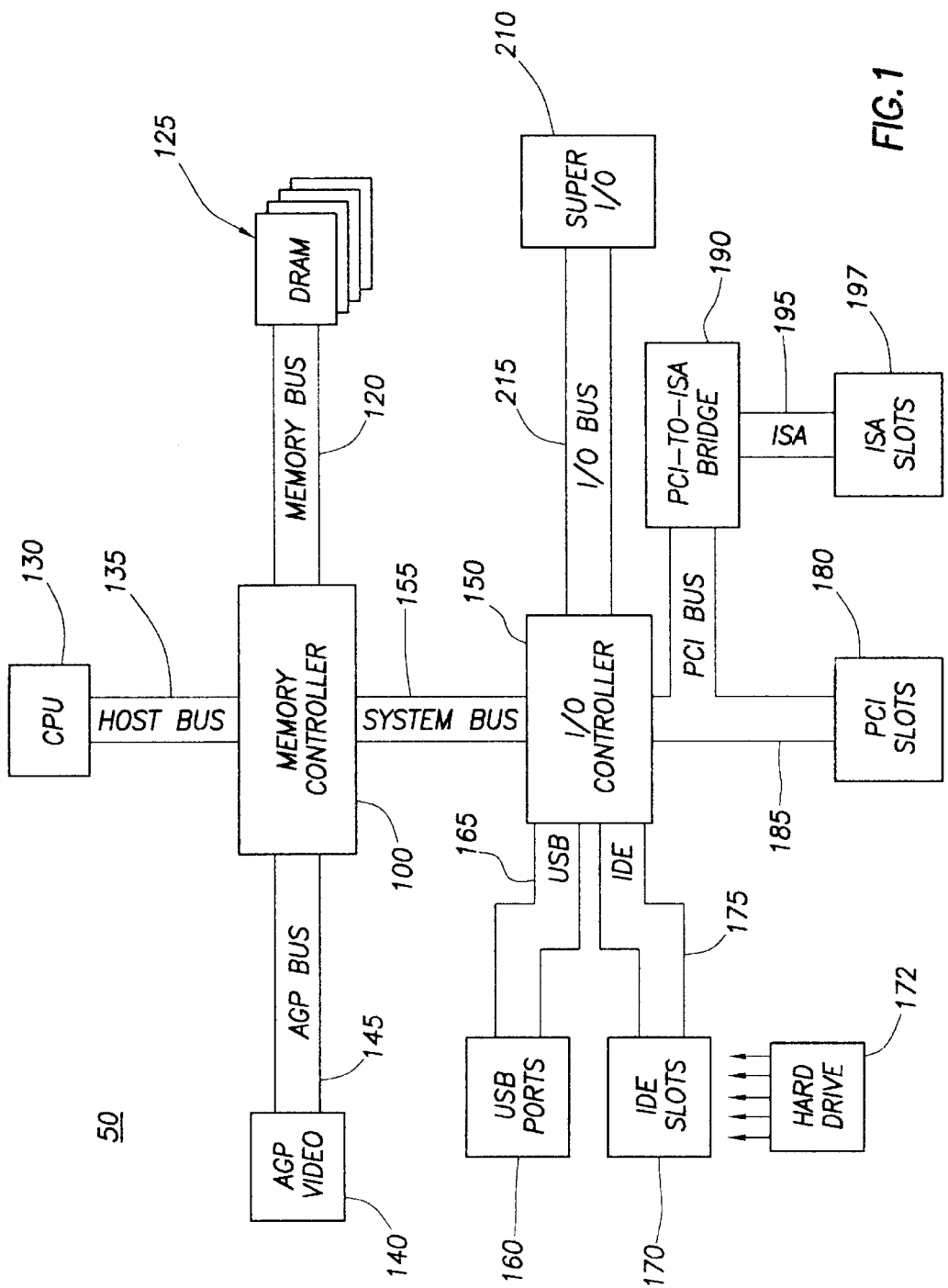
FIG. 1 is a block diagram illustrating an exemplary computer system constructed according to the preferred embodiment.

Referring initially to FIG. 1, a computer system 50 may comprise a personal computer, a web computer, a server, or a workstation, without limitation. Although not shown, the computer system 50 preferably couples via a suitable network connection to a local area network (LAN). As shown in FIG. 1, the computer system 50 preferably implements a standard computer architecture, including a CPU (or processor) 130, system memory 125, a memory controller 100, AGP video controller 140, and I/O controller 150. The processor 130 preferably couples to the memory controller 100 through host bus 135. It should be understood that other embodiments of the invention may include more than one processor or CPU coupled to the host bus. The processor may comprise any suitable microprocessor such as the Pentium II®, Pentium III®, or Celeron® processor by Intel®, the Athlon® processor by AMD, the Alpha processor by Compaq, or other microprocessors from these or other manufacturers that may be used or configured for use in a computer system. The system memory 125 preferably comprises one or more memory devices such as any suitable type of random access memory (RAM). System memory may comprise, for example, synchronous dynamic random access memory (SDRAM), or other memory designs suitable for use in a computer. According to the preferred embodiment, the system memory 125 comprises banks of dynamic random access memory that are volatile in nature. Thus, when power is removed from the system memory, the memory cells lose the data stored therein. As will be discussed in reference to FIGS. 2 and 3, the system memory 125 may comprise error checking memory, such as error checking and correction (ECC) memory, or Parity memory, both of which are well known in the computer industry. Alternatively, the present invention may be implemented without error checking memory, as will be described below. Also, the system memory may be partitioned into memory pages of any arbitrary size. Although not required, partitioning the memory into smaller pages may enable the system to validate pages in a parallel or pipelined fashion, thus reducing the amount of time it takes to validate the contents of system memory when resuming from a low power mode of operation. Partitioning also potentially limits the amount of data that may need to be restored from non-volatile memory, since corrupt data can be identified more precisely.

The memory controller 100 permits the processor 130 and other devices in computer system 50 to read data from or write data to system memory 125. Thus, the memory controller formats data cycles from other components in the computer system 50 in a manner that is compatible with the memory devices used in the system memory 125. The memory controller 100 performs necessary precharge charge, refresh, and other cycles as required by the memory devices. In addition, the memory controller issues appropriate commands such as row address strobe commands and column address strobe commands as necessary to access the memory. If error checking memory is used, error checking logic may be included as part of the memory controller, or may be included as part of the memory devices themselves. The error checking logic performs certain integrity checks on the contents of memory as it is read from memory according to techniques that are well known in the industry.

As shown in FIG. 1, the memory controller 100 preferably includes an interface to an advanced graphics port (AGP) to support a graphics video controller 140 or other graphics device. According to normal convention, an AGP bus 145 couples the video controller 140 to the memory controller 100. As one skilled in the art will understand, graphics processors or accelerators implementing other protocols also may be used instead of an AGP controller. Typically, a monitor (not shown) couples to the video controller 140. The memory controller 100 also preferably functions as an interface to a system or peripheral bus 155. In the preferred embodiment, the system bus 155 comprises a high-speed data bus to the I/O controller hub 150.

The I/O controller hub 150 bridges the system bus 155 to a variety of peripheral busses, including a USB bus 165, an IDE bus 175, and a PCI bus 185. Coupled to each of these busses are ports or slots that enable compatible devices to be connected to the computer system 50. Thus, for example, a PCI peripheral device, such as a PCI-compatible network interface card (or NIC) may be inserted into one of the PCI slots 180, for coupling to the I/O controller 150 via the PCI bus 185. In similar fashion, USB devices may be connected to the computer system through one or more USB ports 160, and IDE devices may be connected to the system by inserting the IDE device in any available IDE slot 170. Thus, in accordance with the preferred embodiment, one or more hard drive devices 172 may be inserted in the IDE slots 170, as shown in FIG. 1. To support legacy ISA devices, a PCI-to-ISA bridge 190 preferably couples to the PCI bus 185. A conventional ISA bus 195 couples ISA slots 197 to the PCI-to-ISA bridge 190. Other devices, such as a modem, audio amplifier, or LAN connection may connect directly to the I/O controller hub 150, or may couple via the conventional peripheral busses.

As shown in FIG. 1, the I/O controller hub 150 preferably couples to a Super I/O controller 210 through an I/O bus 215. The Super I/O device 210 preferably includes conventional ports for coupling to floppy disk drives, a keyboard, and a mouse. Thus, the Super I/O device 210 preferably includes conventional keyboard and mouse controllers for converting user inputs to a traditional format for relaying to the CPU 130. The Super I/O 210 also preferably includes standard parallel and serial ports to permit other peripheral devices to be added to the computer system 50, as desired by the user.

It should be understood that although a preferred architecture is shown for a computer system, that various other architectures are possible. Thus, for example, conventional North bridge and South bridge topology may be used, if desired. The system architecture of the system is not critical, and thus the invention should not be construed as limited to a particular architecture.

The present invention may be used in any computer system that includes a volatile memory and a non-volatile memory, and which may be placed in a low power mode. In addition, the present invention may be used in any system in which corrupted data can not be tolerated. The present invention preferably comprises a portable computer system, or other computer system that supports a low power mode of operation. Preferably, the low power mode comprises a Reliable Suspend to RAM mode that operates by making a back-up copy of the system memory 125 to the non-volatile hard drive 172 prior to entering the suspend mode. As will be apparent to one skilled in the art, other non-volatile memory devices may be used instead of the hard drive. Examples include CR-ROMs, DVD-ROMs, zip drives, tape drives, and the like. When the system is ready to resume operation, the system checks the contents of the system memory 125 for errors. If an error is found in the system memory 125, the system substitutes the invalid data in memory with reliable data from the hard drive 172 or other non-volatile memory device.

The present invention may be implemented with an error checking and correction (ECC) DRAM or Parity memory, or in a system without error checking DRAM. ECC DRAM is tolerant of the failure of a few bits in any byte, and may even mend itself using correction algorithms that are known in the industry. If multiple bits are corrupted, or if a single bit failure occurs for parity memory, the address for a faulty memory section may be identified so that the invalid memory section is isolated within a few bytes.

Figure 2:
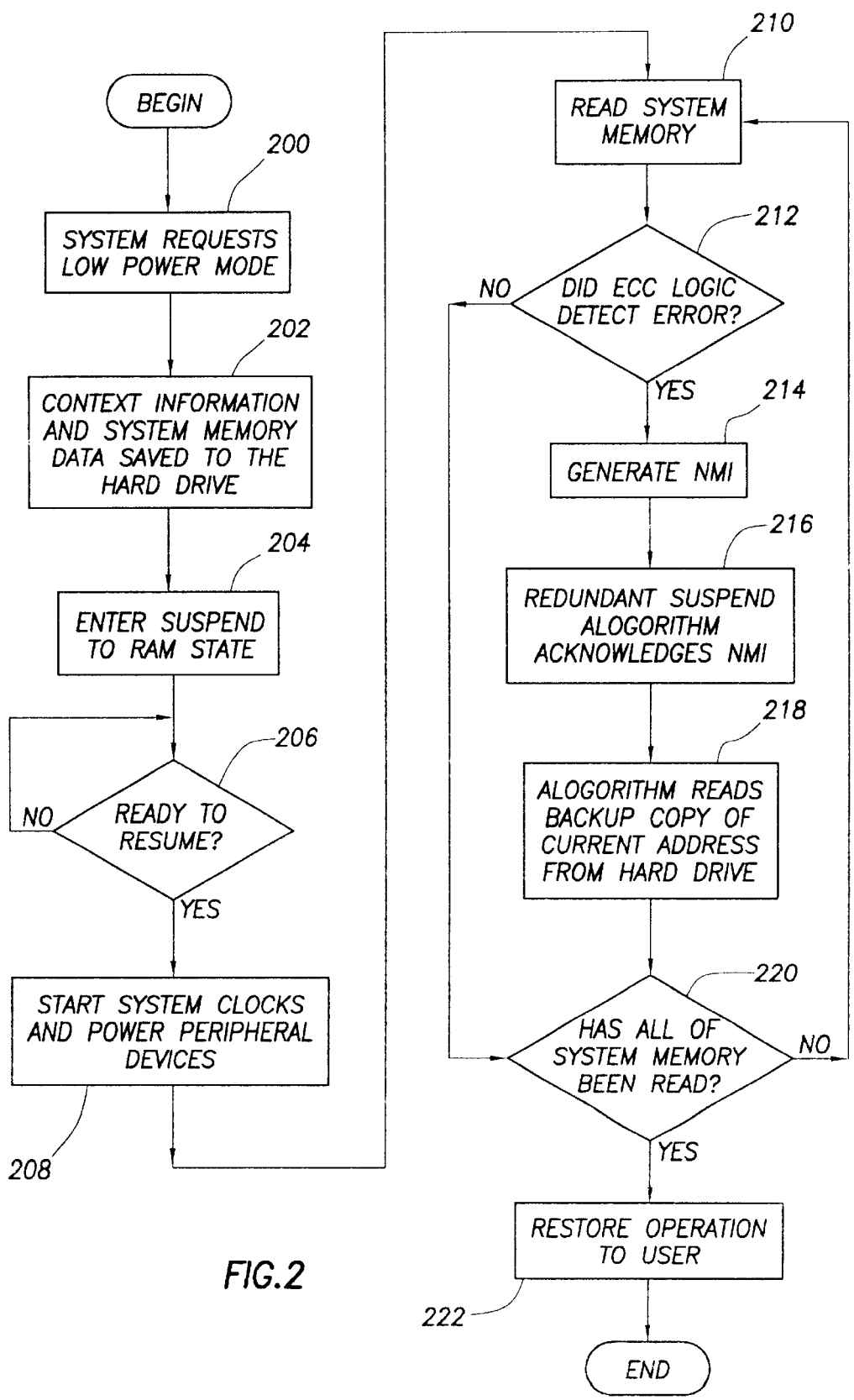
FIG. 2 is a flow chart depicting an exemplary operation of the Redundant Suspend to RAM technique in the system of FIG. 1, with which error checking memory is implemented.

Referring now to FIG. 2, one embodiment of the present invention is shown for implementation with error checking memory, such as ECC DRAM or Parity memory. The flow chart of FIG. 2 may be implemented as a state machine, or as a separately executing program or algorithm. The flow logic shown in FIG. 2 may be implemented by the CPU, or by other programmable logic located elsewhere, such as in the memory or memory controller.

The sequence for performing a reliable resume from Suspend to RAM begins when the system initiates a low power mode (step 200). When the suspend event is initiated in step 202, the system BIOS or operating system running on the CPU 130 preferably initiates the saving of context information and data in system memory 125 to the hard drive 172. The algorithm used to perform this operation is similar to that conventionally used for Hibernation to Disk, and makes an exact association of the system memory address to the location on the hard drive. Thus, the algorithm executing in the CPU tracks the association of DRAM contents to locations on the hard drive. After this backup occurs, the computer system enters the Suspend to RAM state in step 204, where the system memory 125 remains powered to preserve the data in the DRAM cells. As part of step 204, the clocks to the peripheral devices in the computer system 125 are stopped, and power is removed from the peripheral devices.

When resume is initiated (step 206), error checking and memory substitution are performed as part of the resume process. Thus, in step 208, the system clocks are started, and all peripheral devices are powered on. At this point in a normal resume of a Suspend to RAM, control passes to the user. According to the preferred embodiment of the present invention, several other steps are taken before control is passed to the user to verify the validity of the data in RAM. Thus, in step 210, the algorithm executing on the CPU performs a read of the system memory 125. If a data error is detected in the system memory by the ECC logic (step 212), an NMI (non-maskable interrupt) will be generated as part of the read process (step 214). According to the preferred embodiment, the Redundant Suspend algorithm executing on the CPU acknowledges the NMI in step 216. The algorithm inherently is cognizant of the current address where the memory error was generated as part of the read process, and thus the algorithm, in response to receipt of the NMI, issues a read request to the associated backup copy of that address in the hard drive (step 218). The data read from the hard drive is then written to the system memory to replace the invalid data in the system memory. Once the system memory contents have been substituted with the hard drive backup copy, the Redundant Suspend algorithm continues to read the remaining portions of the system memory in step 220. As shown in step 222, once the entire system memory has been read and validated, operation is restored to the user. Thus, using the flow logic of FIG. 2, the system examines the integrity of data stored in system memory when resuming from a suspend mode.

The operation of an exemplary system that does not implement ECC DRAM will now be described with reference to FIG. 3. It should be noted that most personal computer systems currently do not include ECC or Parity memory devices because of the cost associated with these types of memory devices. In systems that do not include error checking capabilities, there is no simple way to detect errors on a per-byte or word level. To compensate for this, the present invention preferably includes logic that supports a high level error checking capability that may be implemented in software or hardware, as desired by the manufacturer. Thus, in accordance with the embodiment of FIG. 3, the present invention preferably makes a signature of the system memory contents before suspend mode is entered, and saves that signature value. During the resume sequence, the system memory contents are checked for discrepancies with the saved signature value. To increase the resolution of the signature technique, the memory preferably is partitioned into smaller pages. The size of these pages is arbitrary.

Figure 3:
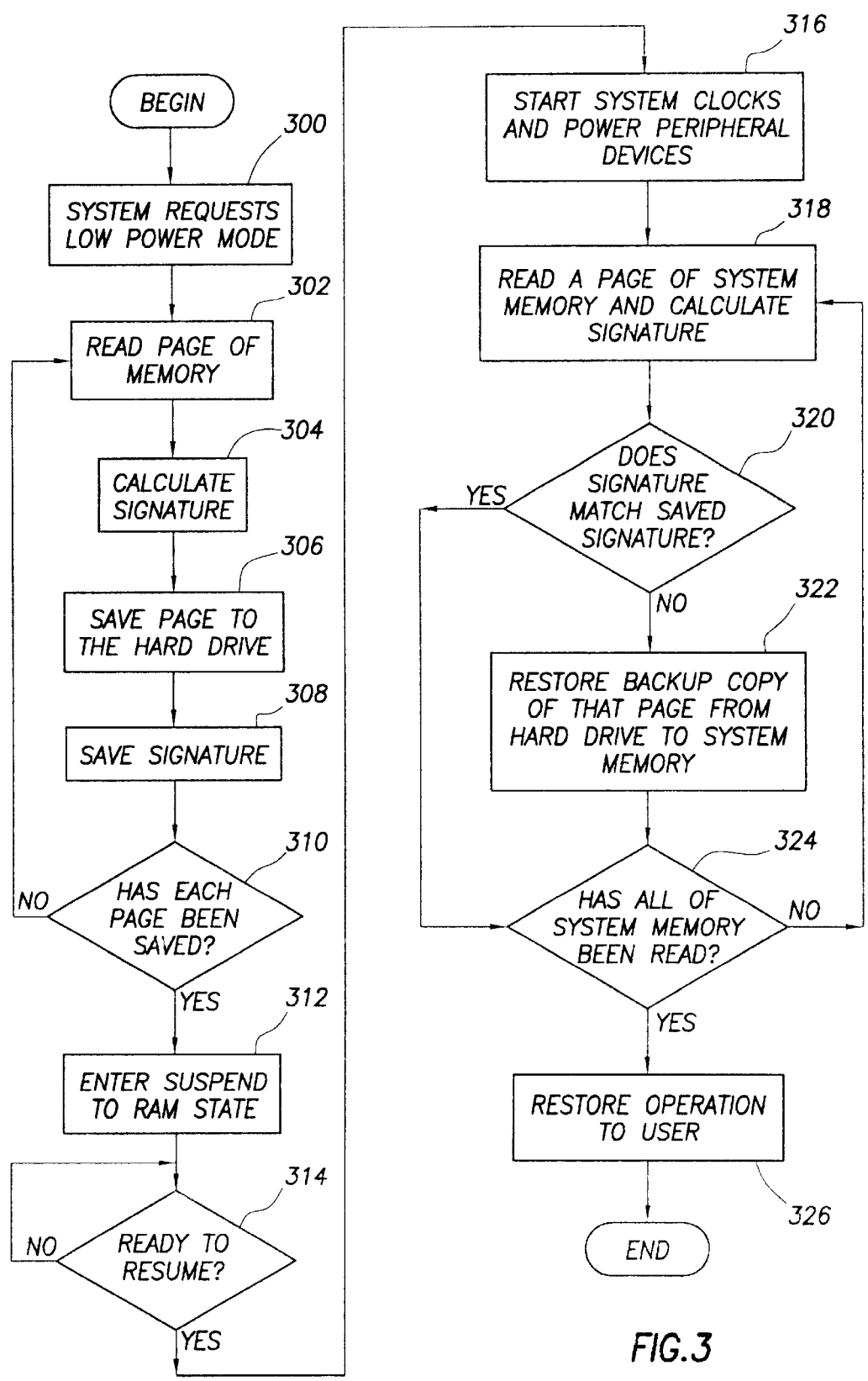
FIG. 3 is a flow chart depicting another exemplary alternative of the Redundant Suspend to RAM technique in system of FIG. 1, with which standard memory components are used that do not include error checking capabilities.

Referring now to FIG. 3, when the suspend event is initiated in step 300, the system BIOS or operating system initially performs an operation similar to a Hibernation to Disk, except that the system memory contents are not treated as a single contiguous block. Instead, the preferred method is to store the memory contents to the hard drive in several pages, with each page having a direct association with particular memory addresses. Thus, for example, a system with 64 MB of DRAM memory may be divided by the algorithm into 4 pages of memory, each with 16 MB. Other page divisions are possible, and pages of much smaller size may be used, if desired. As an example, a page size consistent with page sizes used by the Intel Pentium processor may be used, which typically are 4 KB. Thus, the page size is completely arbitrary with the system designer, and not a limitation of the present invention. Regardless of the page size, an associated signature of each page is calculated and kept in either non-volatile or volatile system memory.

Referring still to FIG. 3, the system memory preferably is read 32 bits at a time and is stored with a known association onto the hard drive. In this example, the Hibernation file (the file that is backed up to non-volatile memory) contains 4 pages of memory, each 16 MB long. As the algorithm reads the data off the system memory (step 302), it develops a signature (step 304), such as a checksum value or a CRC (Cyclical Redundancy Check) value. A CRC value represents a more unique signature than a simple checksum, but requires more processing power to generate. After the page of memory is stored onto the hard drive (step 306), the signature value calculated by the algorithm is stored in either volatile (such as DRAM) or non-volatile (such as the hard drive or static RAM) memory, as shown in step 308. Each of the subsequent pages is read in similar fashion, and a signature is calculated for each of these sections and stored in memory for each page of system memory, as shown by step 310. At that time, the system enters the Suspend to RAM state, in which the clocks are turned off and power is removed from the peripheral devices (step 312).

When a resume operation occurs (step 314), error checking and memory substitution is performed on a page-by-page basis. Initially, the clocks are started and power is turned on to the peripherals to initiate the resume process (step 316). Next, the algorithm performs a read of the system memory. In accordance with this embodiment, the algorithm reads a page of system memory and calculates the signature for that page (step 318). The algorithm then retrieves the stored signature and compares that signature to the signature calculated during the resume operation, as shown in step 320. If the signatures match, that page or section of memory is assumed to be valid. If the signatures do not match, the contents of that section of system memory are assumed to be invalid, and thus that page is restored from the hard drive to the system memory (step 322). Once each page of system memory has been validated or substituted with the hard drive backup copy (step 324), the Redundant suspend Algorithm hands the operation of the system back to the user (step 326).

FIGS. 2 and 3 thus show exemplary flow logic for implementing a Redundant Suspend to RAM operation. It should be understood, however, that many other variations are possible based on the principles advanced above. For example, it is possible to alter the resume sequence to minimize the time it takes to resume normal operation from a Suspend to RAM. Resume time can be an important consideration to certain users, and thus it is advantageous to minimize resume time. The method described in conjunction with FIGS. 2 and 3 contemplate a serial process of checking the memory before handing control to the user. The delay associated with such a serial process in large memory systems may be deemed unacceptable in some situations.

As an alternative to this serial approach, the validation algorithm may work in the background after system operation is restored. In this approach, the operating system must monitor accesses to any memory pages or sections that have not been validated. At least two techniques may be used by the operating system. The first technique is to have the algorithm disallow accesses to memory address ranges that have not been validated. If an access is made to a memory range that has not been validated by the Redundant Suspend Algorithm, the Algorithm may intervene by first checking that memory address range before allowing the application or the operating system to use that memory address range. The second technique is for the Algorithm to let accesses occur to address ranges that have not been validated. If, however, a write operation occurs to an unchecked address range, the hard drive image will become incoherent and the algorithm will relinquish the opportunity to validate the memory.

An exemplary method to check the integrity of system memory as a background operation after a system has resumed normal operation uses the Page Translation hardware in the Intel Pentium processor to intercept an access to system memory. When an access is made to a part of system memory that has not yet been validated, an algorithm is called by the CPU to examine the integrity of each page of system memory targeted by the access. If the page of system memory is not valid, then the copy of the page stored in non-volatile memory is written to system memory to replace the invalid data.

Figure 4:
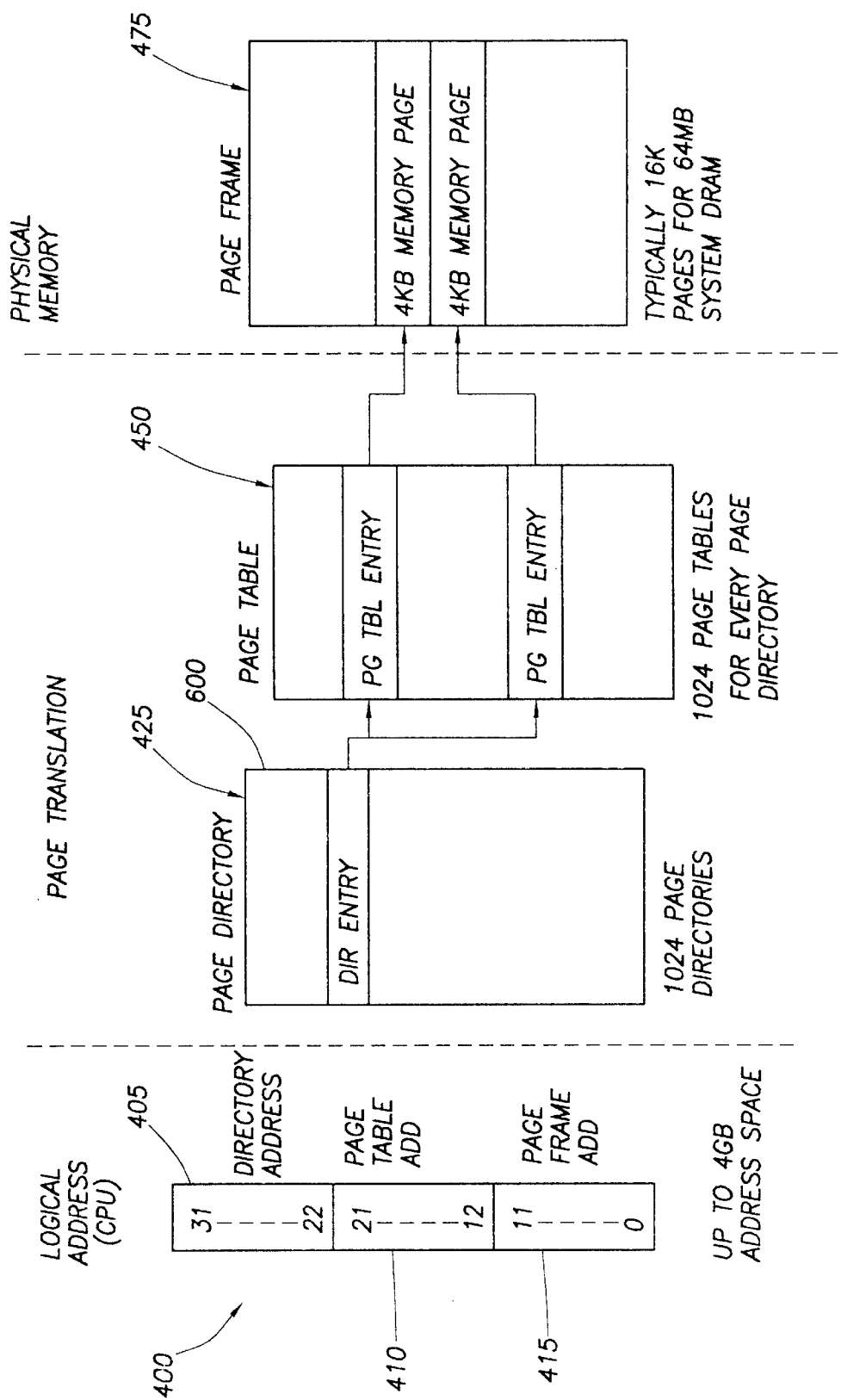
FIG. 4 is a diagram illustrating the manner in which a logical address is translated to a physical memory address.

The following discussion describes one exemplary implementation for a Redundant Suspend to RAM technique in which the algorithm works in the background after the system has resumed operation. This technique uses page translation hardware in the CPU, and thus some background on page translation is provided. Referring now to FIG. 4, the Intel Pentium processor is capable of 4 GB of virtual memory space ($2^{32}$) divided into 4 KB size pages. These pages of memory are mapped into 1024 Page Directories, with each Page Directory including 1024 page tables. As shown in FIG. 4, the logical CPU address 400 includes 32 bits, that are broken into three hierarchical blocks 405, 410, 415. The first block 405 includes address bits 22–31, which select one of the 1024 Page Directories (one of which is shown at 425). Each page Directory will index 1024 Page Tables. The second block 410 of the logical address includes address bits 12–21 that select which one of the 1024 Page Tables will be used. One such page table 450 of Directory 425 is shown. Each Page Table points to a 4 KB block of physical memory space, called a Page Frame 475. Address bits 0–11 of block 415 are used to index within the 4 KB Page Frame.

Figure 6:
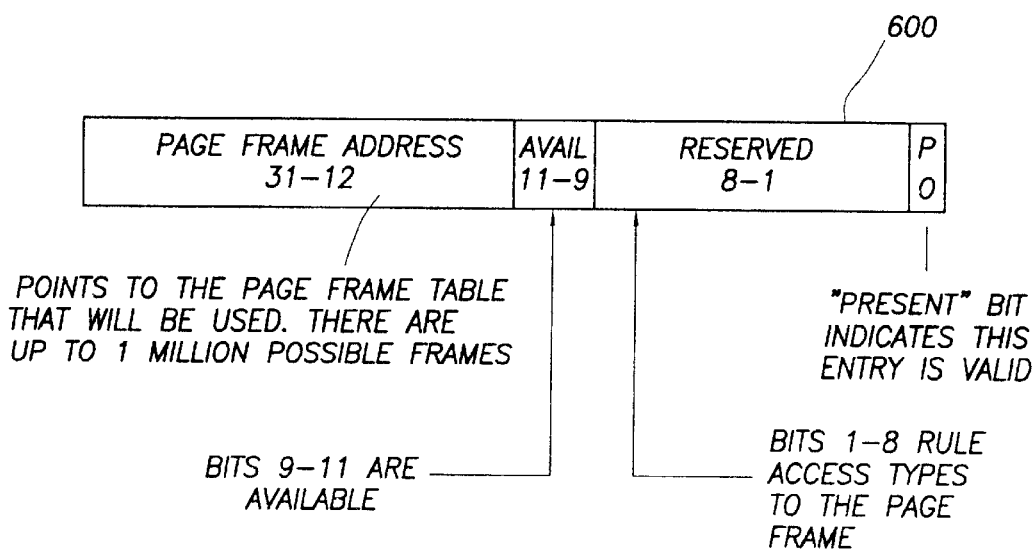
FIG. 6 is an exemplary diagram of a Page Directory Entry register.

The Page Directory and Page Table entries comprise 32-bit registers that contain re-mapping and control fields. As shown in FIG. 6, bit 0 of both the Page Directory and the Page Table entries indicates if the entry is valid. Thus, a zero value in bit 0 of the Page Directory entry 600 indicates that none of the Page Tables which it indexes hold valid data. Similarly, a zero value in bit 0 of a Page Table entry indicates that Page Table is not associated with a valid Page Frame. Bits 1–8 of each Page Directory entry and each Page Table entry hold information relating to the characteristics of the Page Frame, such as whether it is cacheable, writeable, etc. Bits 9–11 have no designated function, and may be used by the operating system or by other algorithms. According to the embodiment disclosed herein, bit 9 is used in the present invention to indicate if the data has been validated after a resume operation. Bits 12–31 of the Page Directory and Page Table registers form the address to the Page Frame that will be used. This is the actual physical address used to select which of the one million 4 KB pages in memory is being accessed.

Figure 5:
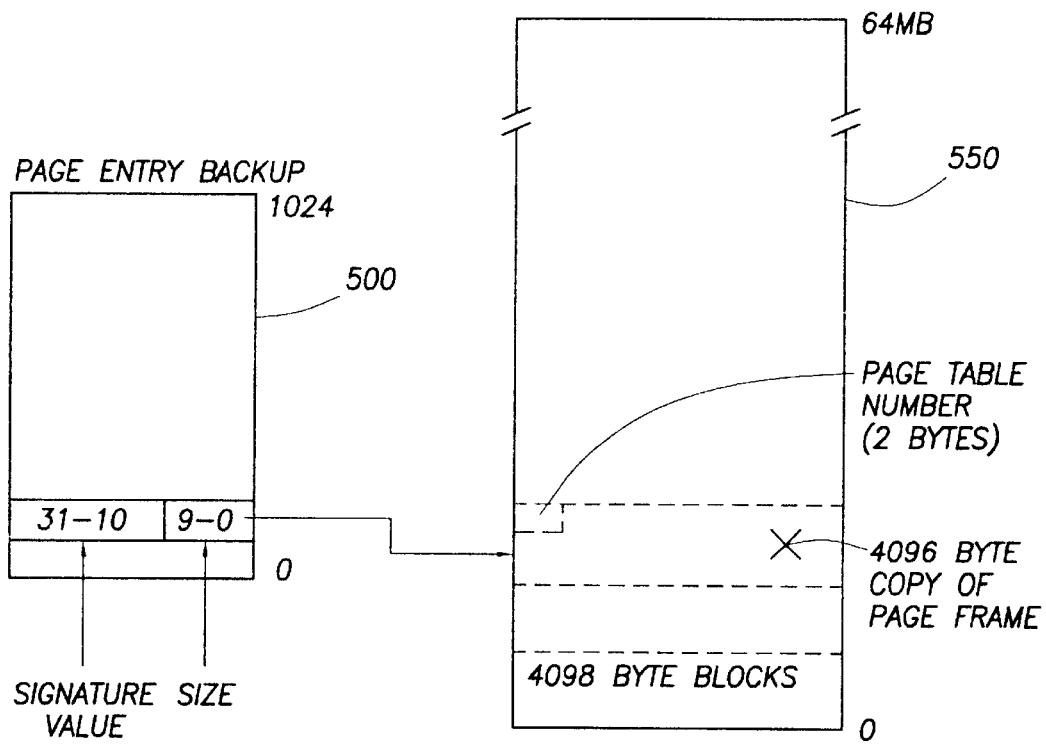
FIG. 5 is a diagram illustrating a Page Entry Register and an associated Hibernation Data file that are saved to non-volatile memory prior to entering a Suspend state.

Thus, according to the preferred embodiment, the system memory 125 (FIG. 1) preferably is organized as 1024 page directories, each with 1024 page tables that map to 4 KB of system memory. Prior to entering suspend mode, a copy and a description of the system memory is calculated and stored onto the hard drive by the algorithm. Referring to FIG. 5, preferably, the algorithm stores 1024 doublewords in a Page Entry Backup Register 500, with one doubleword (32 bits) associated with one Page Directory. The doubleword for each Page Directory describes the memory associated with each Page Directory. This description preferably includes a 22 bit signature value that will be created for all the memory that is accessible under each Page Directory. The signature value may represent a CRC value or checksum of all the 4 KB blocks beneath each Page Directory. The description also preferably includes a 10 bit size value (representing up to 1024 pages of memory) that indicates the number of 4 KB blocks that are stored to the hard drive and associated with that Page Directory. The maximum amount of memory under any Page Directory is 4 MB, which equate to 1024 pages of 4 KB memory. If there is no valid memory stored in the Page Tables behind the Page Directory, the signature and size values are represented as "0" for all 32 bits.

In addition to the signature value and size value stored in the Page Entry Backup Register 500, the algorithm also preferably generates a Hibernation Data file 550 that contains a copy of the system memory contents, and each page address. For each active Page Table, a DRAM Image is stored in the Hibernation Data file that includes the Page Table number that is copied, and the contents of the 4 KB memory pointed to by that Page Table. Thus, according to the preferred embodiment, the DRAM Image includes 2 bytes that identify the Page Table number, which ranges from 0 to 1023. The DRAM Image also includes 4096 bytes of information copied from the 4 KB memory frame pointed to by the associated Page Table. Thus, each DRAM Image preferably is 4098 bytes long, which includes two bytes of overhead for identifying the active Page Frame.

Referring now to FIGS. 4, 5 and 6, when suspend is initiated, the Page Directory and Page Table entries are tested to determine if they reference a valid section of system memory. Each 4 KB Page Frame of valid memory is stored to the hard drive in the Hibernation Data file 550, along with a signature of the valid memory in each Page Directory, as identified in the Page Entry Backup Register 500. Whether valid data is present is determined by reading bit 0 (the present bit) of each Page Directory entry. If this bit is not set, then there is no valid memory pointed to by this Page Directory, or any of the Page Tables underneath this Page Directory. The algorithm zeroes the signature and the size bits in the Page Entry Backup Register 500, and also preferably sets bit 9 of the Page Directory Entry 600 to a "0" if no data is valid in the Page Directory.

If, conversely, the present bit is set in the Page Directory entry 600, then there is a valid Page Frame pointed to by the Page Directory. The algorithm then tests each of the 1024 Page Table entries under that Page Directory. Each Page Table includes its own present bit (bit 0) indicating validity of the memory frame pointed to by that table. The algorithm stores each valid 4 KB page of memory to the hard drive in Hibernation Data file 550, together with the number of each table. Pages with no valid memory are not saved into the hibernation file. Once all the Page Frames associated with a Page Directory are stored, the algorithm calculates a signature of all the cumulative 4 KB Page Frames stored that are associated with that Page Directory. The algorithm then writes to the Page Entry Backup Register 500 the number of valid pages stored in the hibernation file for that directory, and the signature accumulated for all of the valid pages of memory associated with that Page Directory. The present bit (bit 0) then is cleared in that Page Directory Entry. Bit 9 of each Page Directory entry then is set to a "1", which will then be used by the algorithm during the resume process. Once this process is repeated for each Page Directory, the entire contents of system memory will have been saved to the hard drive or other non-volatile memory. The system then may enter the Suspend to RAM state. It should be noted that the signature value may be calculated for each Page Table that is stored, instead of obtaining a cumulative signature for the Page Directory. This would provide greater resolution so that validation and substitution of a section of memory can be performed faster.

According to this embodiment of the invention, the system performs a fast resume, without requiring that all of the system memory be validated prior to resuming operation. The validation operation preferably executes in the background until completed. In the event, however, that a data cycle targets any memory address that has not been validated, the algorithm intercepts that access. Because the Present bits of the Page Directory entries (bit 0) have been cleared, a Page fault interrupt will be generated when an access targets a memory address that has not been validated. In response to the Page Fault interrupt, the algorithm will be called. The algorithm then checks to see if bit 9 of the Page Directory Entry 600 has been set to "1" to determine if the Page Fault was generated because the DRAM address has not yet been validated, or because the application program was not copied from the hard drive or removable media. If bit 9 is clear (set to "0"), that, coupled with the "0" value in bit 0, indicates that this page of memory did not contain valid data before the suspend operation. The algorithm will then hand control to the Operating System, which will fetch the software application from the hard drive and load it to memory, as usual.

If conversely, bit 9 of the Page Directory Entry 600 is set, then that page was valid before the Suspend operation, and its memory integrity has not yet been checked. The algorithm will then check the validity of that page. This is done by calculating a signature of the valid memory in every page underneath the Page Directory. The calculated signature value than is compared against the signature value stored in the Page Entry Backup Register 500. If the signature does not validate, that section of the DRAM is assumed to be corrupt. Consequently, the algorithm will substitute the non-volatile hard drive data for the corrupted system memory section. This is done by locating the associated page of memory in the Hibernation Data file. A starting address is created for the first page, by adding up the size entries for every previous Page Entry Backup Register entry. For example, if the memory error is associated with Page Directory 980, then the size data for Page Entry Backups 0–979 are added together to find the start address for the data page associated with Page Directory 980. The number of 4 KB blocks to substitute is read in the size information for the present Page Entry Backup (which is the size information for Page Directory 980 in this example). The maximum size is 1024 pages. An index then is formed and the first relevant Page Table address is located inside the Hibernation file. The remaining 4096 bytes of information from that block are copied from the hard drive into system memory. The algorithm repeats this process, copying all the pages associated with that Page Directory to system memory to restore the entire Page Directory (because the signature indicates that there is an error in at least one bit in the Page directory contents). Once all the pages have been validated for a Page Directory, the algorithm will set the present bit (bit 0) in the Page Directory Entry register 600, and clear bit 9. This will indicate that the Page Frames under that Page Directory have been validated since the last resume. At that point, the algorithm returns to the background, and the execution of the application software will start at the address where the Page Fault interrupt was generated.

Preferably, the algorithm is called and validates system memory during idle or slow periods of the CPU and hard drive. The algorithm will validate each page of memory by starting with the first page entry backup. The algorithm will check the size entry for a non-zero value. The algorithm then will validate the DRAM contents for each Page that is indicated to hold valid data. The algorithm will index to the next Page Directory entry until the entire system memory has been validated.

There are a number of variations and modifications that may be made to the present invention. For example, the algorithm may be programmed to distinguish the source of the resume operation. If the resume operation is caused by an electrical wakeup, then any resume latency maybe intolerable. In this instance, the integrity algorithm may ignore the integrity check and assume that the system memory is valid. Thus, a wakeup caused by a modem ring may be handled differently than a manual wakeup caused by the user depressing a key. To detect a critical wakeup, hardware must be capable of identifying the source of the wake up. Typically, each individual wake up source has an associated flag that is set when the wake up condition is detected. The algorithm then can read each flag, and determine if the resume might require a time-critical response. The integrity algorithm may also be designed to spot check the system memory, without checking every single DRAM byte. Thus, the algorithm may be configured to check specific rows or devices as part of the validation process. As yet another alternative, the system can be configured to store a substantial image of the system memory to non-volatile memory, instead of copying on a bit-by-bit basis. Thus, for example, a compressed image of the system memory, or a Hamming code signature of the system memory, may be written to the hard drive in lieu of copying each bit. The term "substantial image" is intended to cover a complete image of the system memory, or a partial or compressed image of the system memory that is sufficient to repair or restore damaged system memory. Moreover, the present invention may also be used to provide a fast resume from a hibernation state, instead of a Suspend to RAM state, by resuming operation before the saved memory pages have been restored to system memory. Additional details regarding the fast resume operation are discussed in co-pending and commonly-assigned U.S. patent application Ser. No. 09/751,165, entitled, "Fast Suspend to Disk," the teachings of which are incorporated by reference herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of validating the contents of system memory, comprising:

partitioning the system memory into pages;

storing a substantial image of the contents of system memory in non-volatile memory;

reading the contents of system memory;

checking the contents of system memory for errors on a page-by-page basis; and restoring the image of a page of data stored in non-volatile memory to system memory if a non-correctable error is found in the contents of the page of memory, wherein the act of restoring occurs on a page-by-page basis for pages where an error is found.

2. The method as in claim 1, wherein said system memory comprises error checking and correction random access memory.

3. The method as in claim 2, wherein the act of checking the contents of system memory comprises having error checking logic examine the contents of system memory for non-correctable errors.

4. The method as in claim 1, wherein said system memory comprises parity memory.

5. The method as in claim 1, wherein the non-volatile memory comprises a hard disk.

6. The method as in claim 1, further comprising the act of calculating a signature value for each page of memory prior to storing a substantial image to non-volatile memory.

7. The method as in claim 6, further comprising the act of storing the signature value for each page.

8. The method as in claim 7, wherein the act of checking the contents of system memory includes:

calculating a second signature value for each page of memory; and comparing the second signature value for each page with the saved signature value for that page.

9. The method as in claim 8, wherein the act of storing includes:

identifying each page directory that has valid data;

identifying each page table that has valid data;

storing a copy of a page frame addressed by each page table that has valid data, together with a value identifying the associated page table.

10. The method as in claim 9, further comprising the act of calculating a cumulative signature value for each stored page frame associated with a particular page directory.

11. The method as in claim 10, wherein the act of storing the substantial image occurs prior to a system suspend operation, and the error checking and restoration occurs after a system resume operation.

12. The method as in claim 10, further comprising the act of calculating a size value representing the cumulative number of page frames stored for a page directory.

13. The method as in claim 12, further comprising the act of storing the cumulative signature value and the cumulative number of page frames for each page directory.

14. The method as in claim 13, wherein the cumulative signature value and cumulative size value are stored as an entry in a page entry backup register.

15. The method as in claim 14, wherein the copy of the page frame from all valid pages of system memory together with the value identifying the associated page table are stored in a hibernation data file.

16. The method of claim 15, wherein the page entry backup register is stored in non-volatile memory.

17. The method of claim 16, wherein the page directory has an associated page directory register entry, and the page directory register entry includes a designated bit that is cleared until its associated page frames are validated after checking the contents of system memory.

18. The method of claim 17, wherein the act of reading the contents of system memory occurs after a suspend mode is exited.

19. The method of claim 18, wherein the act of reading occurs on a page directory basis in response to a memory access to an address within the page directory.

20. The method of claim 19, wherein the act of reading only occurs if the page directory register present bit is set.

21. The method of claim 20, wherein the act of reading only occurs if the designated bit is cleared.

22. The method of claim 21, wherein the act of checking includes calculating a signature value for each page directory and comparing the calculated signature value with the signature value stored in the page entry backup register.

23. The method as in claim 22, wherein the act of checking is performed on a page directory basis.

24. The method as in claim 22, wherein the act of restoring occurs on a page directory basis if the page directory signature values do not match.

25. A method of placing a computer system into a suspend mode, and resuming normal operation, comprising the acts of:
reading a page of system memory;
calculating a signature for the page;
saving a substantial image of the page of system memory to non-volatile memory:
saving the signature;
entering a suspend state;
resuming normal operation;
reading the page of system memory and calculating a signature of the page of memory;
comparing the signature calculated after resuming normal operation with the signature saved prior to entering the suspended state;
restoring the substantial image of the page of system memory from non-volatile memory and writing to system memory if the signatures do not match.

26. The method of claim 25, wherein each page of memory is read and a signature is calculated for each page of system memory that contains valid data, and each page and associated signature is stored in non-volatile memory.

27. The method of claim 26, wherein each page of memory is read and a signature is calculated and compared to the saved signature to determine if each page of system memory is valid after resuming operation.

28. The method of claim 25, wherein the non-volatile memory comprises a hard disk drive.

29. The method of claim 25, wherein the signature comprises a checksum value.

30. The method of claim 25, wherein the signature comprises a cycle redundancy check value.

31. The method of claim 25, wherein the page of memory is assumed to be valid if the signatures match.

32. The method of claim 25, wherein the suspend state is a Suspend to RAM state where the RAM remains powered.

33. The method of claim 25, wherein the suspend state includes turning off system clocks and removing power from peripheral devices, and the act of resuming normal operation includes turning on system clocks and returning power to the peripheral devices.

34. The method of claim 25, wherein the acts of reading the page of system memory and calculating a signature, comparing the signature with the saved signature, and restoring the substantial image of the page of system memory, all occur in response to an access to that page of memory.

35. The method of claim 25, wherein the acts of reading the page of system memory and calculating a signature, comparing the signature with the saved signature, and restoring the substantial image of the page of system memory, all occur prior to restoring operation to the user.

36. A method of placing a computer system into a low power state, comprising the acts of:
determining if a page of system memory includes valid data;
storing a copy of any pages of valid data into non-volatile memory;
calculating a signature value associated with each page of stored data, and saving that signature value in memory;
placing the computer into a suspend mode where the system memory remains powered;
resuming operation of the computer system; and
validating the contents of system memory by calculating a new signature value for each page of valid date and comparing the new signature value with the saved signature value for each page of valid data.

37. The method of claim 36, wherein the data that is not validated is restored from non-volatile memory.

38. The method of claim 36, wherein the act of storing data includes:
determining if a Page Directory includes valid data;
identifying each Page Table within a Page Directory that includes valid data in system memory, and
saving a copy of the valid data from each table in non-volatile memory, together with a value representing the Page Table number associated with the data from each page of memory.

39. The method of claim 38, wherein the act of calculating a signature value includes concatenating all data from each Page Table within a Page Directory to determine the signature value.

40. The method of claim 39, wherein the method is repeated for each page of memory.

41. The method of claim 38, wherein the signature value is a cumulative checksum of all Page Tables within a Page Directory.

42. The method of claim 41, further comprising the act of saving a value indicating the number of page tables with valid data for each Page Directory.

43. The method of claim 42, wherein the method is repeated for each Page Directory.

44. The method of claim 43, further comprising storing a page entry backup register that includes a signature value and a size value for each Page Directory.

45. A computer system capable of entering a low power mode of operation, comprising:
a CPU;
a system memory that remains powered during the low power mode of operation;
a non-volatile memory device;
wherein the CPU calculates a signature value for data stored in said system memory prior to entering the low power mode, and stores the signature value; and
wherein the CPU copies the data stored in said system memory to non-volatile memory prior to entering the low power mode, and wherein the system memory is partitioned into pages by the CPU, and the CPU calculates a signature value for each page.

46. A system as in claim 45, wherein, after the system exits from the low power mode, the CPU calculates a second signature value and compares that value with the stored signature value.

47. A system as in claim 46, wherein the stored signature value is also stored in non-volatile memory.

48. A system as in claim 47, wherein the CPU restores the copy of the memory page stored in non-volatile RAM to system memory for any memory page for which the second signature value does not match the stored signature value.

49. A system as in claim 46, wherein the non-volatile memory comprises a hard disk.

50. A system as in claim 46, wherein the non-volatile memory comprises static RAM.

51. A system as in claim 45, wherein the system memory comprises error checking and correction memory.

52. A system as in claim 45, wherein the system memory comprises parity memory.

53. A system as in claim 45, wherein the CPU includes page translation hardware that partitions memory into pages.

54. A method of restoring a computer system from a low power state, comprising the acts of:

configuring system memory as a plurality of memory pages;

storing said memory pages to non-volatile memory;

initiating entry into a low power state;

resuming normal operation from the low power state;

intercepting an access to a memory page that has not been restored from non-volatile memory; and restoring the accessed memory page from non-volatile memory.

55. The method of claim 54, wherein the low power stats comprises a hibernation state.

56. The method of claim 55, wherein the low power state comprises a suspend to RAM state.

57. The method of claim 56, wherein the act of restoring the accessed memory page includes determining if the accessed memory page is valid, and copying the stored memory page to system memory if the accessed memory page is invalid.

58. The method of claim 57, wherein the stored memory page is not restored if the accessed memory page is valid.

59. The method of claim 54, wherein the act of restoring the accessed memory page from non-volatile memory only occurs if data in the accessed memory page is corrupted.

* * * * *